US009838857B2

(12) United States Patent
Shariff et al.

(10) Patent No.: US 9,838,857 B2
(45) Date of Patent: Dec. 5, 2017

(54) METHOD FOR ESTABLISHING STATELESS COMMUNICATION BETWEEN TWO OR MORE DEVICES

(71) Applicant: Tata Consultancy Services Limited, Mumbai (IN)

(72) Inventors: Mohammed Yousuf Shariff, Bangalore (IN); Shalin Garg, Bangalore (IN); Sathish Vallat, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 391 days.

(21) Appl. No.: 14/054,579

(22) Filed: Oct. 15, 2013

(65) Prior Publication Data

US 2015/0046559 A1 Feb. 12, 2015

(30) Foreign Application Priority Data

Aug. 12, 2013 (IN) .......................... 2630/MUM/2013

(51) Int. Cl.
*H04W 4/20* (2009.01)
(52) U.S. Cl.
CPC .................... *H04W 4/206* (2013.01)
(58) Field of Classification Search
CPC .. H04W 4/008; H04W 4/206; H04L 63/0492; H04B 4/50
See application file for complete search history.

(56) References Cited

U.S. PATENT DOCUMENTS 8,260,269 B2    9/2012  Faith et al.
9,646,296 B2 *  5/2017  Brown ................. G06Q 20/322
2010/0210323 A1 * 8/2010 Collins ............. H04M 1/72547
                                                                455/575.1
2011/0126009 A1    5/2011  Camp, Jr. et al.
2012/0249430 A1   10/2012  Oster et al.

(Continued)

OTHER PUBLICATIONS

Alireza Sahami Shirazi, Tanja Döring, Pouyan Parvahan, Bernd Ahrens, Albrecht Schmidt Pervasive Computing Group, University of Duisburg Essen, "Poker Surface: Combining a Multi-Touch Table and MobilePhones in Interactive Card Games" Sep. 15-18, 2009.

(Continued)

*Primary Examiner* — Uzma Alam
(74) *Attorney, Agent, or Firm* — Finnegan, Henderson, Farabow, Garrett & Dunner LLP

(57) ABSTRACT

The present disclosure relates generally to communication technologies, and more particularly to a method and system for establishing a stateless communication between the two devices. In one embodiment, a method for providing communication is disclosed, comprising: receiving a first trigger signal from the electronic device and a second trigger signal from the mobile device; matching the first trigger signal with the second trigger signal in order to validate the communication between the electronic device and the mobile device; generating a first identification token for the electronic device and a second identification token for the mobile device based on the matching; transmitting the first identification token to the electronic device and the second identification token to the mobile device; and providing the communication between the electronic device and the mobile device based on the first identification token and the second identification token.

20 Claims, 8 Drawing Sheets

(56) References Cited

U.S. PATENT DOCUMENTS

| | | | | |
|---|---|---|---|---|
| 2013/0002405 A1* | 1/2013 | Pesonen | ................... | H04B 5/00 |
| | | | | 340/10.5 |
| 2014/0148094 A1* | 5/2014 | Park | ....................... | G06Q 50/01 |
| | | | | 455/41.1 |
| 2014/0281946 A1* | 9/2014 | Avni | ..................... | G06T 1/0021 |
| | | | | 715/268 |
| 2015/0012444 A1* | 1/2015 | Brown | ................. | G06Q 20/322 |
| | | | | 705/76 |
| 2015/0017909 A1* | 1/2015 | Meunier | ............ | H04N 5/23229 |
| | | | | 455/41.1 |

OTHER PUBLICATIONS

Philipp Dobrigkeit, Tobias Flach, Peter Faymonville, Jürgen Müller, "Exchange of contact data between mobile phones using NFCIP" Hasso Plattner Institute for Software Systems Engineering, 14482 Potsdam, Germany. (2006).

Albert Huang1 Kari Pulli , Larry Rudolph,Massachusetts Institute of Technology,Nokia Research Center,"Kimono: Kiosk-Mobile Phone Knowledge Sharing System".

George T. Amariucai, Clifford Bergman, Yong Guan, "An Automatic, Time-Based, Secure Pairing Protocol for Passive RFID".

* cited by examiner

US 9,838,857 B2

METHOD FOR ESTABLISHING STATELESS COMMUNICATION BETWEEN TWO OR MORE DEVICES

PRIORITY CLAIM

This U.S. patent application claims priority under 35 U.S.C. §119 to: India Application No. 2630/MUM/2013, filed Aug. 12, 2013. The aforementioned application is incorporated herein by reference in its entirety.

TECHNICAL FIELD

The present disclosure relates generally to communication technologies, and more particularly to a method and system for establishing a stateless communication between two devices.

BACKGROUND

Mobile communication devices may include short-range radio interfaces that can enable communication with other devices using communication protocols. Examples of communication devices may comprise a multi-touch table, a kiosk, a mobile phone, a tablet or the like. Commonly used communication protocols for short-range wireless communications may include Bluetooth® and Near Field Communication (NFC).

In order to provide communication, the communication protocols used today often require explicit pairing between the communication devices. The pairing process requires that the two communication devices recognize each other by exchanging security credentials. Therefore, under existing communication protocols, once pairing of two communication devices is established, the pairing can be used for multiple sessions. The existing communication protocols are thus not stateless in nature.

In order to establish stateless communication between two communication devices, accelerometer-based peer identification and data transfer methods may be used. However, in order to establish the stateless communication, the accelerometer-based peer identification methods require a physical trigger and accelerometer data from the two communication devices.

SUMMARY

Before the present methods, are described, it is appreciated that this application is not limited to the particular embodiments of the systems and methodologies described, as there can be multiple possible embodiments which are not expressly illustrated in the present disclosures. It is also appreciated that the terminology used in the present disclosure is for the purpose of describing the particular versions or embodiments only, and is not intended to limit the scope of the present application. This summary is provided to introduce aspects related to methods for establishing communication between an electronic device and a mobile device through a server and the aspects are further described below in the detailed description. This summary is not intended to identify essential features of the claimed subject matter nor is it intended for use in determining or limiting the scope of the claimed subject matter.

In one embodiment, a method for providing communication between an electronic device and a mobile device through a server is disclosed. The method comprises receiving a first trigger signal from the electronic device and a second trigger signal from the mobile device, wherein the first trigger signal comprises color data generated by the electronic device and wherein the second trigger signal comprises RGB data captured by the mobile device; matching the first trigger signal with the second trigger signal in order to validate the communication between the electronic device and the mobile device; generating a first identification token for the electronic device and a second identification token for the mobile device based on the matching; transmitting the first identification token to the electronic device and the second identification token to the mobile device; and providing the communication between the electronic device and the mobile device based on the first identification token and the second identification token.

In one embodiment, a system for providing communication between an electronic device and a mobile device is disclosed. The system comprises one or more processors; and a memory storing processor-executable instructions comprising instructions to: receive a first trigger signal from the electronic device and a second trigger signal from the mobile device, wherein the first trigger signal comprises color data generated by the electronic device and wherein the second trigger signal comprises RGB data captured by the mobile device; match the first trigger signal with the second trigger signal to validate the communication between the electronic device and the mobile device; generate a first identification token for the electronic device and a second identification token for the mobile device based on matching; transmit the first identification token to the electronic device and the second identification token to the mobile device; and provide the communication between the electronic device and the mobile device based on the first identification token and the second identification token.

In one embodiment, a non-transitory computer program product having embodied thereon computer program instructions for providing communication between an electronic device and a mobile device is disclosed. The instructions comprises instructions for: receiving a first trigger signal from the electronic device and a second trigger signal from the mobile device, wherein the first trigger signal comprises color data generated by the electronic device and wherein the second trigger signal comprises RGB data captured by the mobile device; matching the first trigger signal with the second trigger signal to validate the communication between the electronic device and the mobile device; generating a first identification token for the electronic device and a second identification token for the mobile device based on the matching; transmitting the first identification token to the electronic device and the second identification token to the mobile device; and providing the communication between the electronic device and the mobile device based on the first identification token and the second identification token.

In one embodiment, a method for establishing communication of an electronic device with a mobile device through a server is disclosed. The method comprises: detecting the mobile device after the mobile device is placed on the electronic device; displaying a color image on a display unit of the electronic device based on the detection of the mobile device; transmitting a first trigger signal to the server, wherein the first trigger signal comprises color data of the color image; and receiving a first identification token from the server for establishing the communication with the mobile device.

In one embodiment, an electronic device for establishing communication with a mobile device through a server is disclosed. The electronic device comprises: one or more processors; and a memory storing process-executable instructions comprising instructions to: detect the mobile device after the mobile device is placed on the electronic device; display a color image on a display unit of the electronic device based on the detection; transmit a first trigger signal to the server, wherein the first trigger signal comprises color data of the color image; and receive a first identification token from the server for establishing the communication with the mobile device.

In one embodiment, an electronic device for establishing communication with a mobile device through a server is disclosed. The electronic device comprises: one or more processors; and a memory storing process-executable instructions comprising instructions to: detect the mobile device after the mobile device is placed on the electronic device; display a color image on a display unit of the electronic device based on the detection; transmit a first trigger signal to the server, wherein the first trigger signal comprises color data of the color image; and receive a first identification token from the server for establishing the communication with the mobile device.

In one embodiment, a non-transitory computer program product having embodied thereon computer program instructions for establishing communication of an electronic device with a mobile device through a server is disclosed. the instructions comprises instructions for: detecting the mobile device after the mobile device is placed on the electronic device; displaying a color image on a display unit of the electronic device based on the detection; transmitting a first trigger signal to the server, wherein the first trigger signal comprises color data of the color image; and receiving a first identification token from the server for establishing the communication with the mobile device.

In one embodiment, a method for establishing communication of a mobile device with an electronic device through a server is disclosed. The method comprises: stabilizing accelerometer data of the mobile device after the mobile device is placed on the electronic device; capturing RGB data associated with a color image generated by the electronic device after stabilizing of the accelerometer data; transmitting a second trigger signal to the server, wherein the second trigger signal comprises the captured RGB data; and receiving a second identification token from the server for establishing the communication with the electronic device.

In one embodiment, a mobile device for establishing communication with an electronic device through a server is disclosed. The mobile device comprises: one or more processors; and a memory storing processor-executable instructions comprising instructions to: stabilize accelerometer data of the mobile device after the mobile device is placed on the electronic device; capture RGB data associated with a color image generated by the electronic device after stabilizing of the accelerometer data; transmit a second trigger signal to the server, wherein the second trigger signal comprises the RGB data; and receive a second identification token from the server for establishing of the communication with the electronic device.

In one embodiment, a non-transitory computer program product having embodied thereon computer program instructions for establishing communication of a mobile device with an electronic device through a server is disclosed. The instructions comprises instructions for: stabilizing accelerometer data of the mobile device after the mobile device is placed on the electronic device; capturing RGB data associated with a color image generated by the electronic device after stabilizing the accelerometer data; and transmitting a second trigger signal to the server, wherein the second trigger signal comprises the RGB data; and receiving a second identification token from the server for establishing of the communication with the electronic device.

BRIEF DESCRIPTION OF THE DRAWINGS

The detailed description of embodiments is better understood when read in conjunction with the appended drawings. For the purpose of illustrating embodiments of the disclosure, there is shown in the present document example constructions of the embodiments; however, the embodiments are not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

FIG. 2-B illustrates the electronic device, in accordance with some embodiments.

FIG. 2-C illustrates the mobile device, in accordance with some embodiments.

FIG. 4-B illustrates a method for establishing the communication between the electronic device and the mobile device through the server, in accordance with some embodiments.

FIG. 4-C illustrates a method for establishing the communication between the mobile device and the electronic device through the server, in accordance with some embodiments.

DETAILED DESCRIPTION

Figure 1:
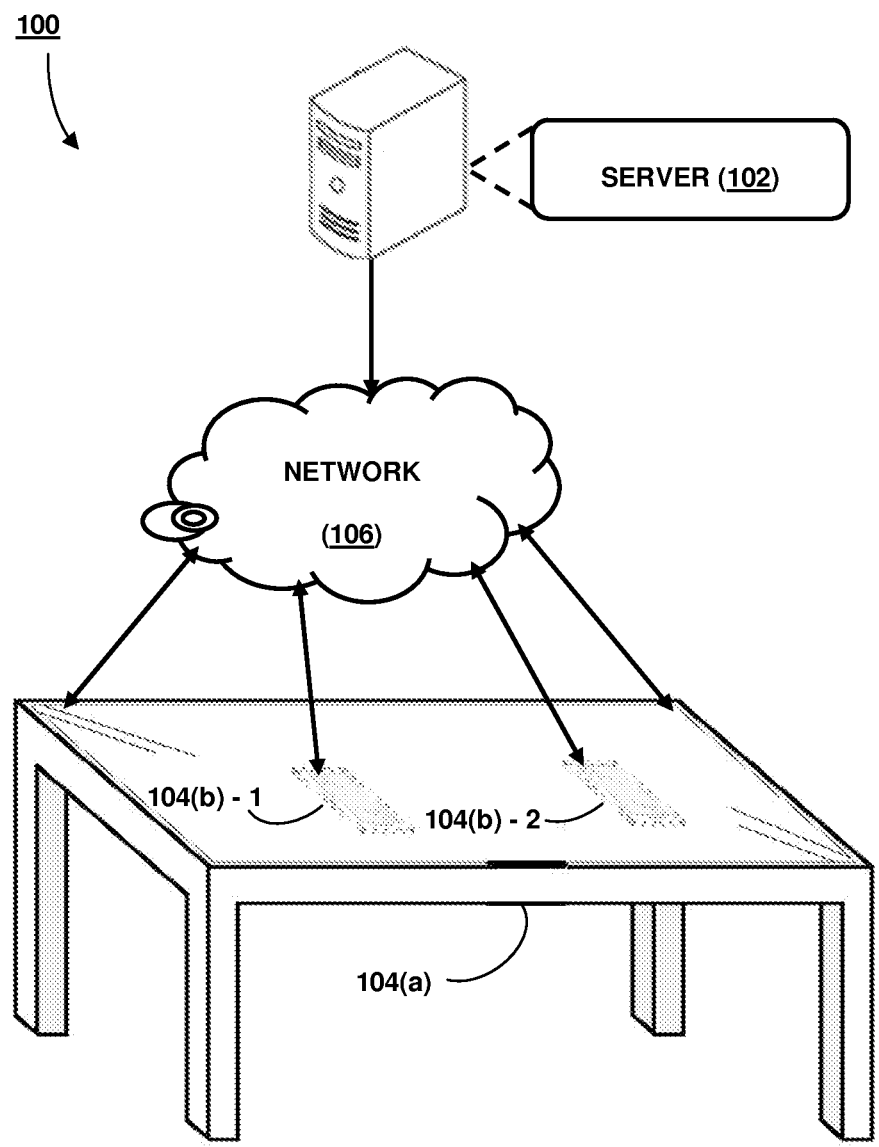
FIG. 1 illustrates a network implementation illustrating communication between an electronic device and a mobile device through a server, in accordance with some embodiments.

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for establishing a communication between an electronic device and a mobile device through a server are described. In one aspect, the communication may be established by at least one of Radio-frequency identification (RFID™), near field communication (NFC), Bluetooth™, Wi-Fi™, and a cellular data network. In one aspect, the electronic device may be at least one of a multi-touch table, a kiosk, and an automatic teller machine (ATM). In one aspect, the mobile device may be at least one of a Smartphone, a personal digital assistant (PDA), a laptop, and a palmtop. In one aspect, the communication between the electronic device and the mobile device may be a stateless communication and hence may not require explicit pairing between the electronic device and the mobile device.

In order to establish the communication between the electronic device and the mobile device, a user of the mobile device may initiate an application installed on the mobile device. The application on initiation may enable the mobile device to communicate with the server. After the user places the mobile device on a display unit of the electronic device, the mobile device may be adapted to stabilize accelerometer data associated with the mobile device. After placing the mobile device on the electronic device, the electronic device may detect an object placed on its display unit and further differentiates it from regular touch input. After detecting the object as the mobile device, the electronic device may be further adapted to display a color image on a display unit of the electronic device. In one aspect, the electronic device may display a sequence of colors at different time instants. The sequence of colors and the timestamp associated with each color of the sequence of colors may be transmitted to the server by the mobile device and the electronic device. In one aspect, the sequence of colors to be displayed on the display unit may be randomly chosen or may be preconfigured in the electronic device.

In one embodiment, the mobile device may be detected by using at least one of a blob detection mechanism and flash of the mobile device. Further, after detecting the mobile device on the display unit, the electronic device may transmit a first trigger signal to the server. In one aspect, the first trigger signal may comprise an identification number of the electronic device, a time stamp of the first trigger signal, and location information of the electronic device.

Based on the stabilization of the accelerometer data and the color image displayed, the mobile device may be further adapted to capture RGB data associated to the color image displayed on the display unit. In one aspect, the RGB data may be captured by an image capturing unit such as camera embedded with the mobile device. After capturing the RGB data, the mobile device may further transmit a second trigger signal comprising the RGB data to the server. In one aspect, the second trigger signal may further comprise an identification number of the mobile device, a time stamp of the second trigger signal, and location information of the mobile device.

After receiving the first trigger signal and the second trigger signal, the server may match the first trigger signal with the second trigger signal in order to validate a desired communication between the electronic device and the mobile device. After matching the first trigger signal with the second trigger signal, the server may be further adapted to generate a first identification token for the electronic device and a second identification token for the mobile device. In order to facilitate the communication between the electronic device and the mobile device, the server may transmit the first identification token to the electronic device and the second identification token to the mobile device. In one aspect, the first identification token may comprise the identification number of the mobile device whereas the second identification token may comprise the identification number of the electronic device.

The electronic device and the mobile device may be then adapted to receive the first identification token and the second identification token respectively from the server in order to establish the communication between them. After receiving the first identification token and the second identification token, the electronic device and the mobile device may establish the communication that may be used for one time data exchange. In one aspect, the stateless communication may be established as long as the mobile device remains being placed on the electronic device.

While aspects of described system and method for establishing the communication between the electronic device and the mobile device through the server may be implemented in any number of different computing systems, environments, and/or configurations, the embodiments are described in the context of the following exemplary system.

In accordance with some embodiments, referring to FIG. 1, a network implementation 100 may comprise a system 102, hereinafter referred as a server 102, providing communication between an electronic device 104(a) and mobile devices 104(b)-1 and 104(b)-2 (collectively as mobile device 104(b)). In some embodiments, the electronic device 104(a) may detect the mobile device 104(b) after the mobile device 104(b) is placed on a display unit of the electronic device 104(a). After the mobile device 104(b) is placed on the display unit of the electronic device 104(a), the mobile device 104(b) may be adapted to stabilize associated accelerometer data.

After detecting the mobile device 104(b), the electronic device 104(a) may further display a color image on the display unit of the electronic device 104(a). In some embodiments, the display unit may be a touch screen having a plurality of sensors. Subsequent to displaying of the color image, the electronic device 104(a) may further transmit a first trigger signal to the server 102. Subsequent to the stabilizing of the accelerometer data and on the color image displayed on the display unit, the mobile device 104(b) may be further adapted to capture Red-Green-Blue (RGB) data associated with the color image generated by the electronic device 104(a). The mobile device 104(b) may further transmit a second trigger signal to the server 102 comprising the RGB data.

After receiving the first trigger signal transmitted from the electronic device 104(a) and the second trigger signal transmitted from the mobile device 104(b), the server 102 may further match the first trigger signal with the second trigger signal in order to validate an intended communication between the electronic device 104(a) and the mobile device 104(b). After matching the first trigger signal with the second trigger signal, the server 102 may further generate a first identification token corresponding to the electronic device 104(a) and a second identification token corresponding to the mobile device 104(b). After generating the first identification token and the second identification token, the server 102 may further transmit the first identification token to the electronic device 104(a) and the second identification token to the mobile device 104(b). In some embodiments, the first identification token and the second identification token may enable the communication between the electronic device 104(a) and the mobile device 104(b).

In some embodiments, the first identification token and the second identification token may then be received by the electronic device 104(a) and the mobile device 104(b), respectively. After receiving the first identification token and the second identification token, the communication between the electronic device 104(a) and the mobile device 104(b) may be established.

It is appreciated by one of ordinary skill in the art that the server 102 may be implemented in a variety of computing systems, such as a laptop computer, a desktop computer, a notebook, a workstation, a mainframe computer, a server, a network server, and the like. The server 102 may be accessed by the electronic device 104(a) and one or more mobile devices 104(b)-1, 104(b)-2 . . . 104(b)-N, collectively referred to as the mobile device 104(b) or applications residing on the mobile device 104(b). Examples of the electronic device 104(a) may include, but are not limited to, a multi-touch table, a kiosk, an automatic teller machine (ATM). The mobile device 104(b) may include, but are not limited to, a portable computer, a personal digital assistant, a handheld device, and a workstation. The mobile device 104(b) may be communicatively coupled to the server 102 through a network 106.

In some embodiments, the network 106 may be a wireless network, a wired network, or a combination thereof. The network 106 can be implemented as one or more of different types of networks, such as Intranet, Local Area Network (LAN), Wide Area Network (WAN), the Internet, and the like. The network 106 may either be a dedicated network or a shared network. A shared network represents an association of the different types of networks that may use one or more protocols, such as Hypertext Transfer Protocol (HTTP), Transmission Control Protocol/Internet Protocol (TCP/IP), Wireless Application Protocol (WAP), and the like. Further the network 106 may include a variety of network devices, including routers, bridges, servers, computing devices, storage devices, and the like.

Figure 2A:
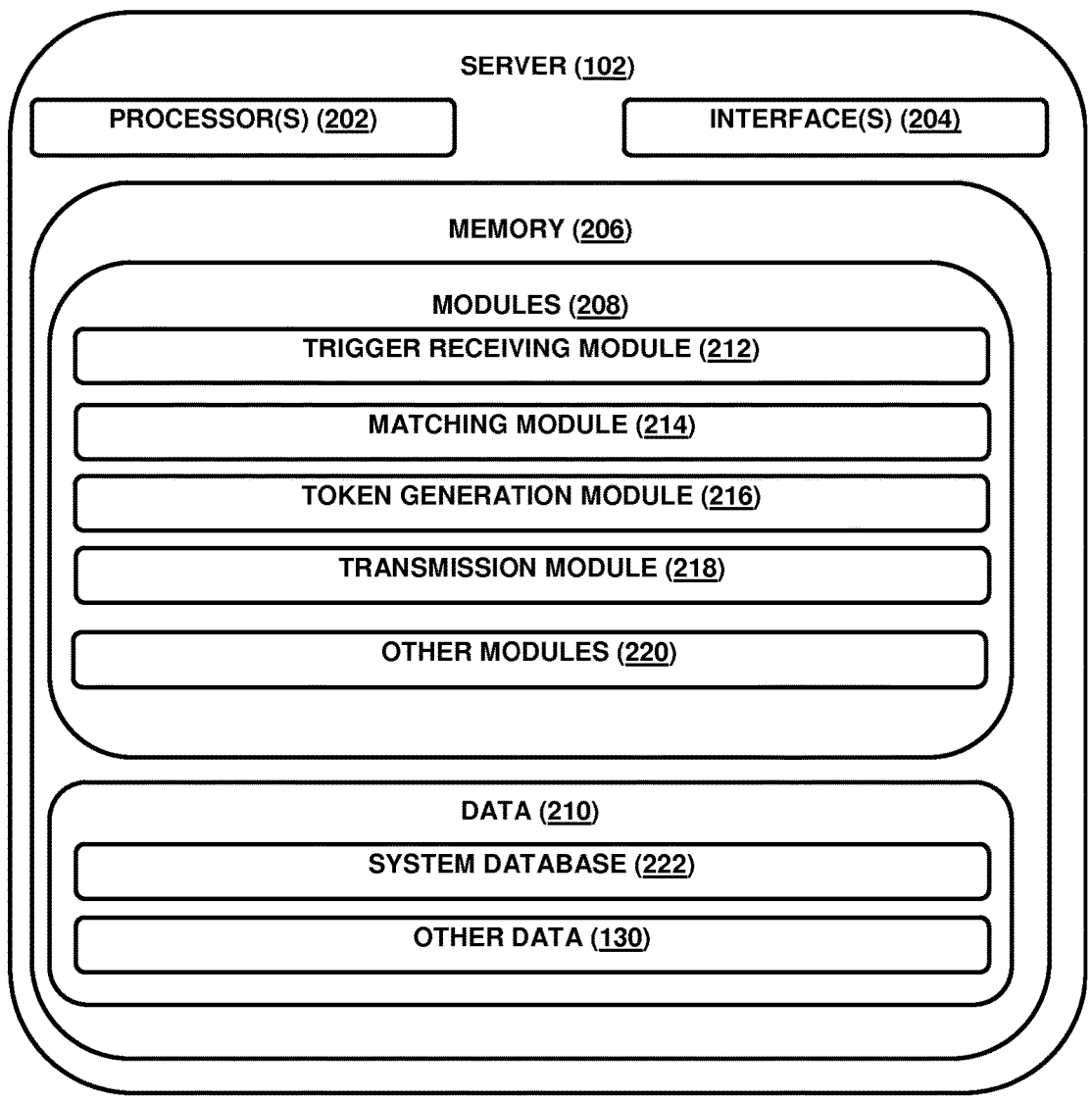
FIG. 2-A illustrates the server, in accordance with some embodiments.
Figure 2B:
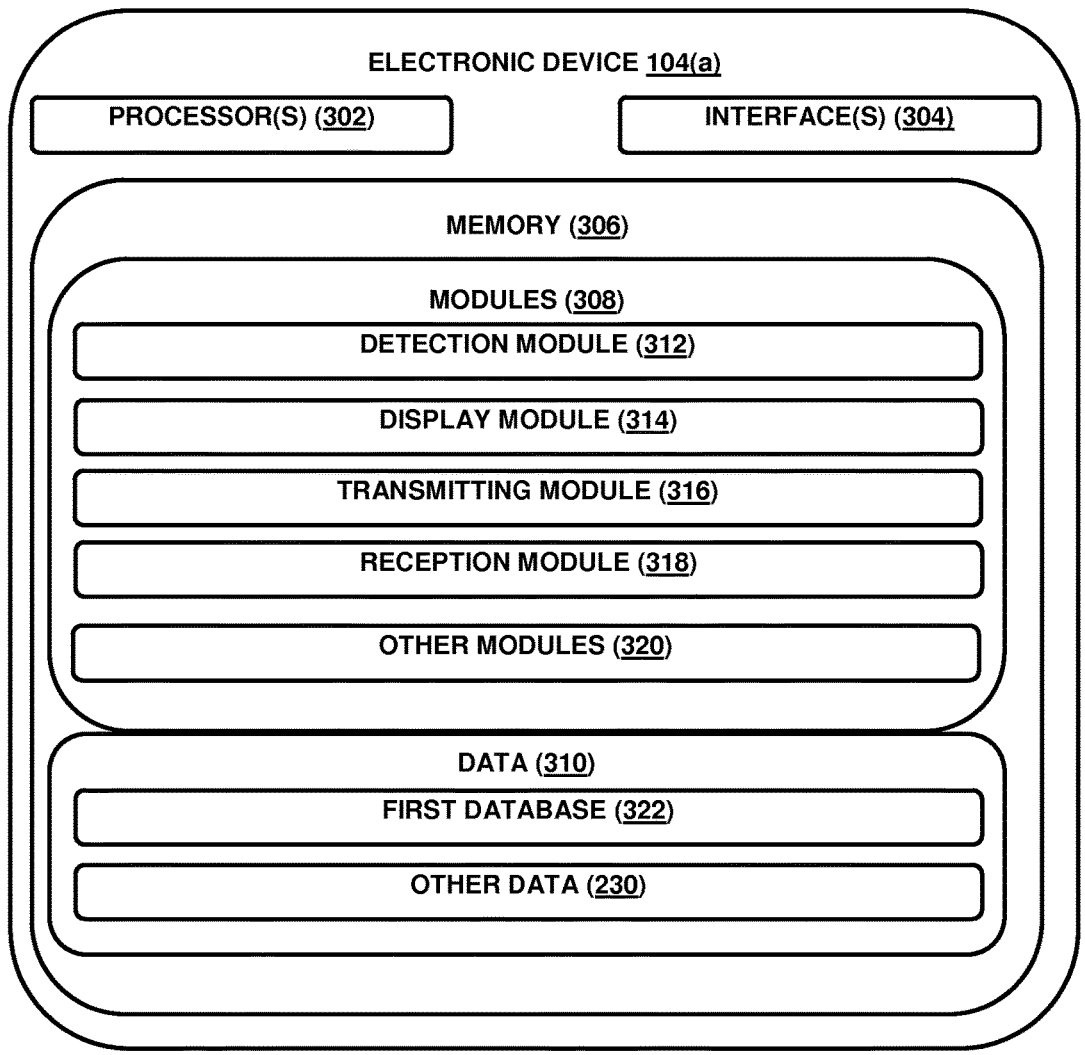
Figure 2C:
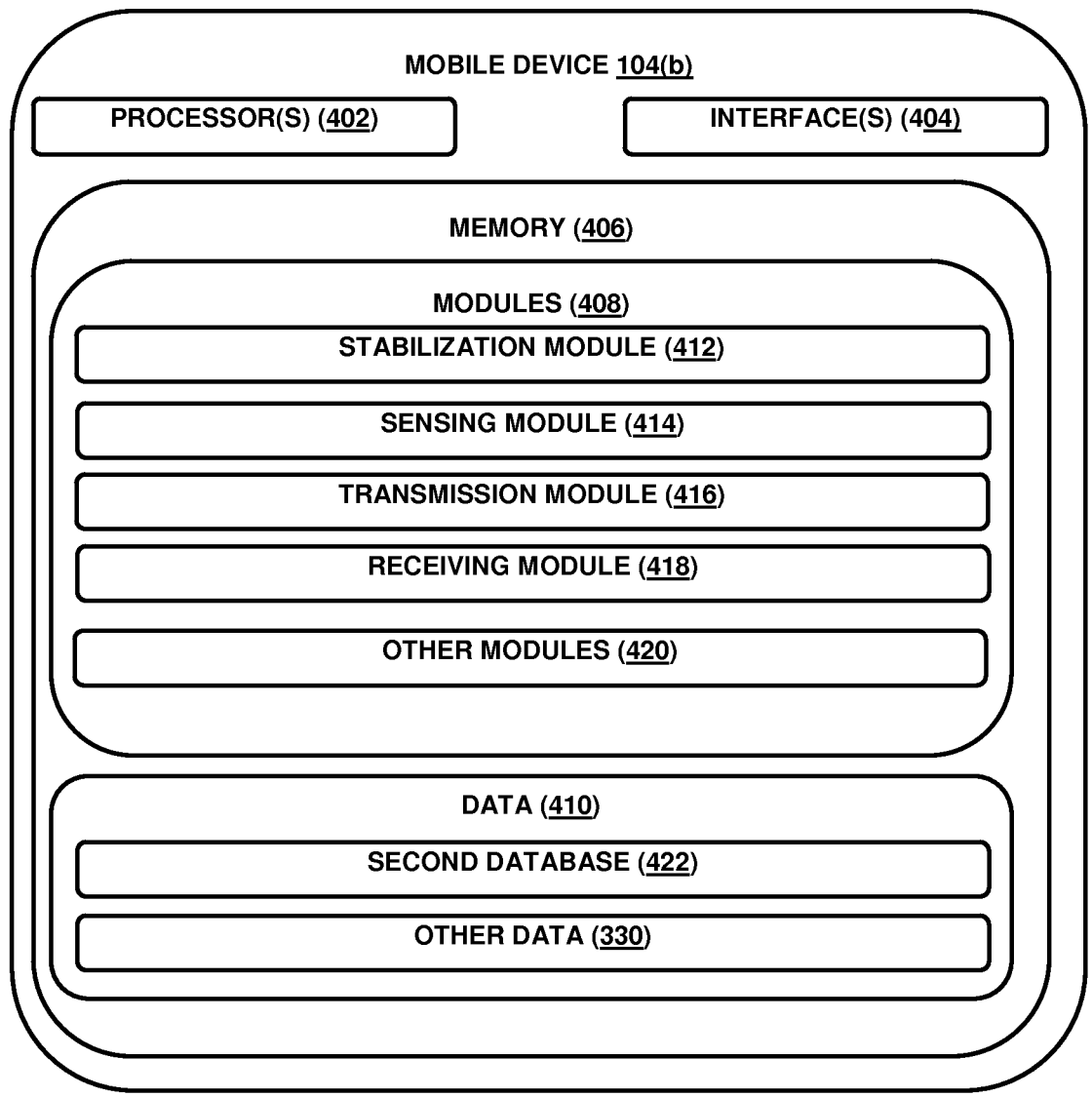

Referring now to FIG. 2-A, the server 102 is illustrated in accordance with some embodiments of the present disclosure. In some embodiments, the server 102 may include one or more processor(s) 202, an input/output (I/O) interface 204, and a memory 206. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 may be configured to fetch and execute computer-readable instructions stored in the memory 206.

The I/O interface(s) 204 may include one or more software and hardware interfaces, such as a web interface, a graphical user interface, and the like. The I/O interface(s) 204 may allow the server 102 to interact with an electronic device 104(a) and the mobile device 104(b). Furthermore, the I/O interface(s) 204 may enable the server 102 to communicate with other computing devices, such as web servers and external data servers (not shown). The I/O interface(s) 204 can enable communications within a wide variety of networks and communication protocols, including wired networks, such as LAN, WAN, cable, etc., and wireless networks, such as WLAN, cellular, or satellite networks. The I/O interface 204 may include one or more ports configured to connect a number of devices to one another or to another server.

The memory 206 may include any computer-readable medium and computer program product including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a trigger receiving module 212, a matching module 214, a token generation module 216, a transmission module 218 and other modules 220. The other modules 220 may include programs or coded instructions that supplement applications and functions of the server 102.

The data 210, amongst other things, serves as a repository for storing data processed, received, and generated by one or more of the modules 208. The data 210 may also include a system database 222, and other data 130. The other data 130 may include data generated as a result of the execution of one or more modules in the other modules 220.

Referring now to FIG. 2-B, the electronic device 104(a) is illustrated in accordance with an embodiment of the present subject matter. In some embodiments, the electronic device 104(a) may include one or more processor(s) 302, one or more input/output (I/O) interfaces 304, and a memory 306. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 may be configured to fetch and execute computer-readable instructions stored in the memory 306.

The I/O interface(s) 304 may include a variety of software and hardware interfaces, for example, a web interface, a graphical user interface, and the like. The I/O interface(s) 304 may allow the electronic device 104(a) to interact with the server 102 and the mobile device 104(b). Further, the I/O interface(s) 304 may enable the electronic device 104(a) to communicate with other computing devices, such as web servers and external data servers (not shown). The I/O interface(s) 304 can enable communications within a wide variety of networks and communication protocols, including wired networks, such as LAN, cable, etc., and wireless networks, such as WLAN, cellular, or satellite. The I/O interface(s) 304 may include one or more ports configured to connect a number of devices to one another or to another server.

The memory 306 may include any computer-readable medium and computer program product including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 310.

The modules 308 include routines, programs, objects, components, data structures, etc., which perform particular tasks or implement particular abstract data types. In one implementation, the modules 308 may include a detection module 312, a display module 314, a transmitting module 316, a receiving module 318 and other modules 320. The other modules 320 may include programs or coded instructions that supplement applications and functions of the electronic device 104(a).

The data 310, amongst other things, serves as a repository for storing data processed, received, and generated by one or more of the modules 308. The data 310 may also include a first database 322, and other data 230. The other data 230 may include data generated as a result of the execution of one or more modules in the other modules 320.

Referring now to FIG. 2-C, the mobile device 104(b) is illustrated in accordance with an embodiment of the present subject matter. In some embodiments, the mobile device 104(b) may include one or more processor(s) 402, one or more input/output (I/O) interface 404, and a memory 406. The processor(s) 402 may be implemented as one or more microprocessors, microcomputers, microcontrollers, digital signal processors, central processing units, state machines, logic circuitries, and/or any devices that manipulate signals based on operational instructions. Among other capabilities, the processor(s) 402 is configured to fetch and execute computer-readable instructions stored in the memory 406.

The I/O interface(s) 404 may include a variety of software and hardware interfaces, for example, a web interface, a graphical user interface, and the like. The I/O interface(s) 404 may allow a user directly or through the mobile device 104(b) to interact with a server 102 and the electronic device 104(a). Furthermore, the I/O interface(s) 404 may enable the mobile device 104(b) to communicate with other computing devices, such as web servers and external data servers (not shown). The I/O interface(s) 404 can enable communications within a wide variety of networks and communication protocols, including wired networks, such as LAN, cable, etc., and wireless networks, such as WLAN, cellular, or satellite. The I/O interface(s) 404 may include one or more ports for connecting a number of devices to one another or to another server.

The memory 406 may include any computer-readable medium and computer program product including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 406 may include modules 408 and data 410.

The modules 408 include routines, programs, objects, components, data structures, etc., which perform particular tasks or implement particular abstract data types. In one implementation, the modules 408 may include a stabilization module 412, a sensing module 414, a transmission module 416, a receiving module 418 and other modules 420. The other modules 420 may include programs or coded instructions that supplement applications and functions of the mobile device 104(b).

The data 410, amongst other things, serves as a repository for storing data processed, received, and generated by one or more of the modules 408. The data 410 may also include a second database 422, and other data 330. The other data 330 may include data generated as a result of the execution of one or more modules in the other modules 420.

The operation of the server 102, the electronic device 104(a) and the mobile device 104(b) are explained in detail in FIG. 3, FIG. 4-A, FIG. 4-B, and FIG. 4-C below.

Figure 3:
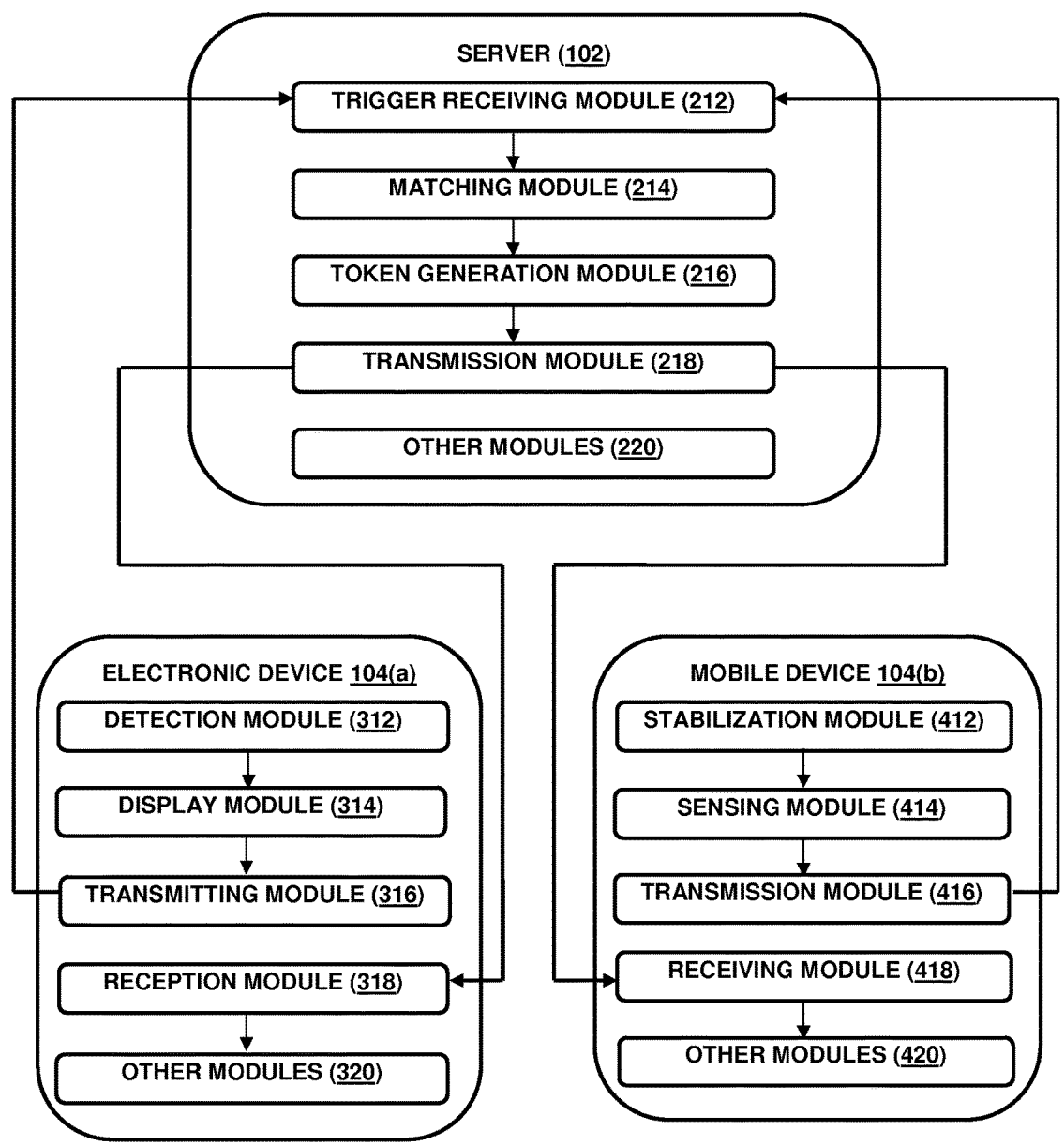
FIG. 3 illustrates a method for establishing the communication between the electronic device and the mobile device through the server, in accordance with some embodiments.

FIG. 3 illustrates the operation of the components involved for establishing the communication between the electronic device 104(a) and the mobile device 104(b) through the server 102, in accordance with some embodiments of the present disclosure. In some embodiments, the communication may be a one-time stateless communication established by at least one of Radio-frequency identification (RFID™), near field communication (NFC), Bluetooth™, Wi-Fi™ and a cellular data network. In one aspect, the electronic device 104(a) may be at least one of a multi-touch table, a kiosk and an automatic teller machine (ATM). In one aspect, the mobile device 104(b) may be at least one of a Smartphone, a personal digital assistant (PDA), a laptop and a palmtop.

In some embodiments, a user of the mobile device 104(b), may initiate an application installed on the mobile device 104(b). After the user places the mobile device 104(b) on a display unit of the electronic device 104(a), the stabilization module 412 may be configured to stabilize accelerometer data of the mobile device 104(b). In one aspect, the communication may be initiated after the mobile device 104(b) is placed on the electronic device 104(a) causing the accelerometer data of the mobile device 104(b) to become stable with respect to at least one axis.

In some embodiments, the detection module 312 may be configured to detect an object placed on the display unit. The detection module 312 may further be configured to differentiate the object from regular touch input. In one aspect, the detection module 312 may detect the object as the mobile device 104(b) by using at least one of a blob detection mechanism and flash of the mobile device 104(b). In one aspect, the blob detection mechanism may enable the electronic device 104(a) to detect the mobile device 104(b) that has been kept on the display unit as an object, which is different from the normal touch input received on the electronic device 104(a). The blob detection mechanism may further enable the electronic device 104(a) to display a color image on the display unit of the electronic device 104(a). In another aspect, the electronic device 104(a) may not detect the object as the mobile device 104(b) and does not display the color image; and the mobile device 104(b), after a predefined time-out, may employ the flash to generate the blob on the display unit of the electronic device 104(a). After generating the blob, the electronic device 104(a) may then detect the blob. Furthermore, a start time may be recorded after the flash is turned on and a stop time may be recorded after the flash is turned off. In one aspect, the start time and the stop time may be communicated to the server 102 for synchronization and detection of the peer device for communication.

After detecting the mobile device 104(b), the display module 314 may be configured to display the color image on the display unit of the electronic device 104(a). In one aspect, the display module may be coupled to an image generation module (not shown). The image generation module may further be configured to generate the color image. The color image may be associated to the mobile device 104(b). In another aspect, the color image may be generated by the server 102. In order to generate the color image, the server 102 may have a preconfigured list of a RGB Hexadecimal (Hex) codes that are configured as a part of the server 102. In one aspect, the server 102 may also be adapted to randomly generate the RGB Hex Code. In some embodiments, the electronic device 104(a) may display a sequence of colors at different time instants. The sequence of colors and the timestamp associated with each color of the sequence of colors may be transmitted to the server 102 by the mobile device 104(b) and the electronic device 104(a). In one aspect, the sequence of colors to be displayed on the display unit may be randomly chosen or may be preconfigured in the electronic device 104(a).

After displaying the color image, the transmitting module 316 may be further configured to transmit a first trigger signal to the server 102. In one aspect, the first trigger signal may comprise color data associated to the color image, an identification number of the electronic device 104(a), a time stamp of the second trigger signal, and location information of the electronic device 104(a). The color data associated to the color image may comprise a representation of additive color mixing having a value associated with three different colors, i.e. Red, Green, and Blue.

Based on the stabilization of the accelerometer data and the color image displayed on the electronic device 104(a), the sensing module 414 may be configured to capture RGB data associated with the color image generated by the electronic device 104(a). The RGB data may comprise the representation of additive color mixing having the value associated with three different colors, i.e. Red, Green and Blue. In one aspect, the RGB data may be captured by an image capturing unit such as camera embedded with the mobile device 104(b). After capturing the RGB data, the transmission module 416 may be configured to transmit a second trigger signal comprising the RGB data to the server 102. In one aspect, the second trigger signal may further comprise an identification number of the mobile device 104(b), a time stamp of the second trigger signal, and location information of the mobile device 104(b).

The first trigger signal and the second trigger signal may then be received by the trigger receiving module 212. After receiving the first trigger signal and the second trigger signal, the matching module 214 may be configured to match the first trigger signal with the second trigger signal to validate the desired communication between the electronic device 104(a) and the mobile device 104(b). In one aspect, the matching module 214 may be configured to match one or more of the color data, the identification number of the electronic device 104(a), a time stamp of the first trigger signal and location information of the electronic device 104(a) with the RGB data, the identification number of the mobile device 104(b), a time stamp of the second trigger signal, and location information of the mobile device 104(b). After matching the first trigger signal with the second trigger signal, the token generation module 216 may be configured to generate a first identification token for the electronic device 104(a) and a second identification token for the mobile device 104(b).

In order to enable the communication between the electronic device 104(a) and the mobile device 104(b), the transmission module 218 may be configured to transmit the first identification token to the electronic device 104(a) and the second identification token to the mobile device 104(b). In one aspect, the first identification token may comprise the identification number of the mobile device 104(b). And the second identification token may comprise the identification number of the electronic device 104(a). After the first identification token and the second identification token are transmitted, the first identification token and the second identification token may be received by the electronic device 104(a) and the mobile device 104(b) respectively. In one aspect, the first identification token may be received by the receiving module 318; and the second identification token may be received by the receiving module 418.

The electronic device 104(a) and the mobile device 104(b) may then be adapted to receive the first identification token and the second identification token, respectively, from the server 102 in order to establish the communication between them. After receiving the first identification token, the electronic device 104(a) may recognize the mobile device 104(b) based on the identification number. Similarly, after receiving the second identification token, the mobile device 104(b) may recognize the electronic device 104(a). Therefore, communication between the electronic device 104(a) and the mobile device 104(b) may be established for one time data exchange. In some embodiments, the communication may remain established as long as the mobile device 104(b) is placed on the electronic device 104(a). The communication may be terminated after the mobile device 104(b) is displaced from the display unit of the electronic device 104(a). Furthermore, in some embodiments, the electronic device 104(a) may initiate the disconnection after it detects that the mobile device 104(b) has been displaced from the display unit. In some embodiments, the communication may get terminated after the mobile device 104(b) is destabilized with respect to the at least one axis.

In some embodiments, the server 102 may further enable establishing of the communication between two mobile devices (e.g., 104(b)-1 and 104(b)-2 shown in FIG. 1) placed on the electronic device 104(a). In one aspect, the mobile device 104(b)-1 and the mobile device 104(b)-2 may be placed on the display unit of the electronic device 104(a). After the mobile device 104(b)-1 and the mobile device 104(b)-2 are placed on the electronic device 104(a); the electronic device 104(a) may be adapted to detect two objects as the two mobile devices 104(b)-1 and 104(b)-2. Furthermore, the electronic device 104(a) may further be adapted to generate two color images for the device mobile 104(b)-1 and the mobile device 104(b)-2. In one aspect, the two color images may be different from each other and having different image properties. Subsequent to the generation of the two color images, the electronic device 104(a) may be configured to transmit first trigger signals to the server 102 corresponding to the mobile device 104(b)-1 and the mobile device 104(b)-2.

The mobile device 104(b)-1 and the mobile device 104(b)-2 may further be adapted to transmit a second trigger signal to the server 102. In one aspect, the second trigger signal may comprise the RGB data associated to the color image, identification number of the mobile device, and the location information of the mobile device. In one aspect, each of the two mobile devices may transmit the second trigger signal separately to the server 102. The second trigger signals transmitted by the two mobile devices may be received by the server 102. In one aspect, the server 102 may further be adapted to match the first trigger signals and the second trigger signals in order to enable the desired communication between the two mobile devices.

Figure 4A:
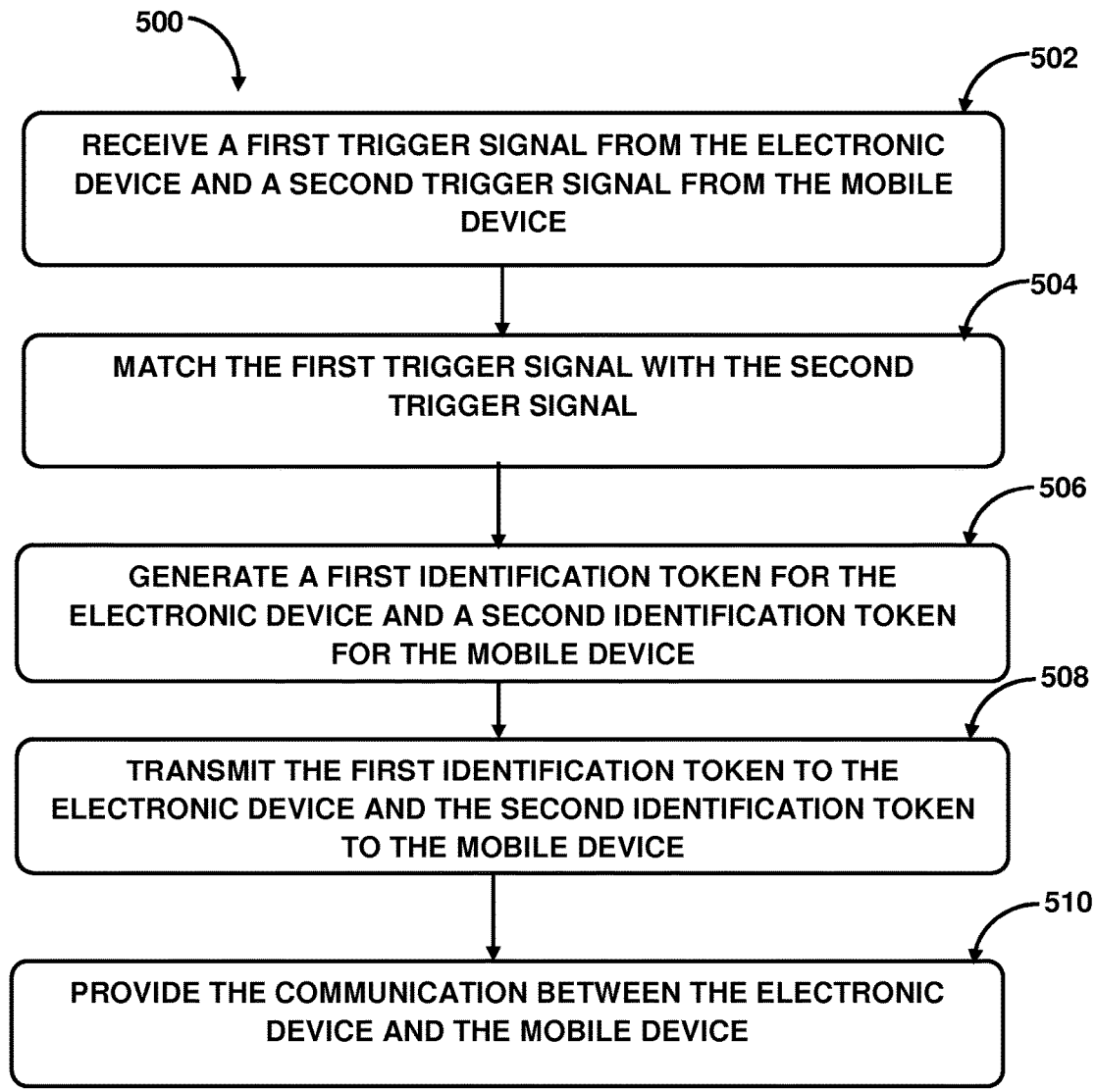
FIG. 4-A illustrates a method for providing the communication between the electronic device and the mobile device through the server, in accordance with some embodiments.
Figure 4B:
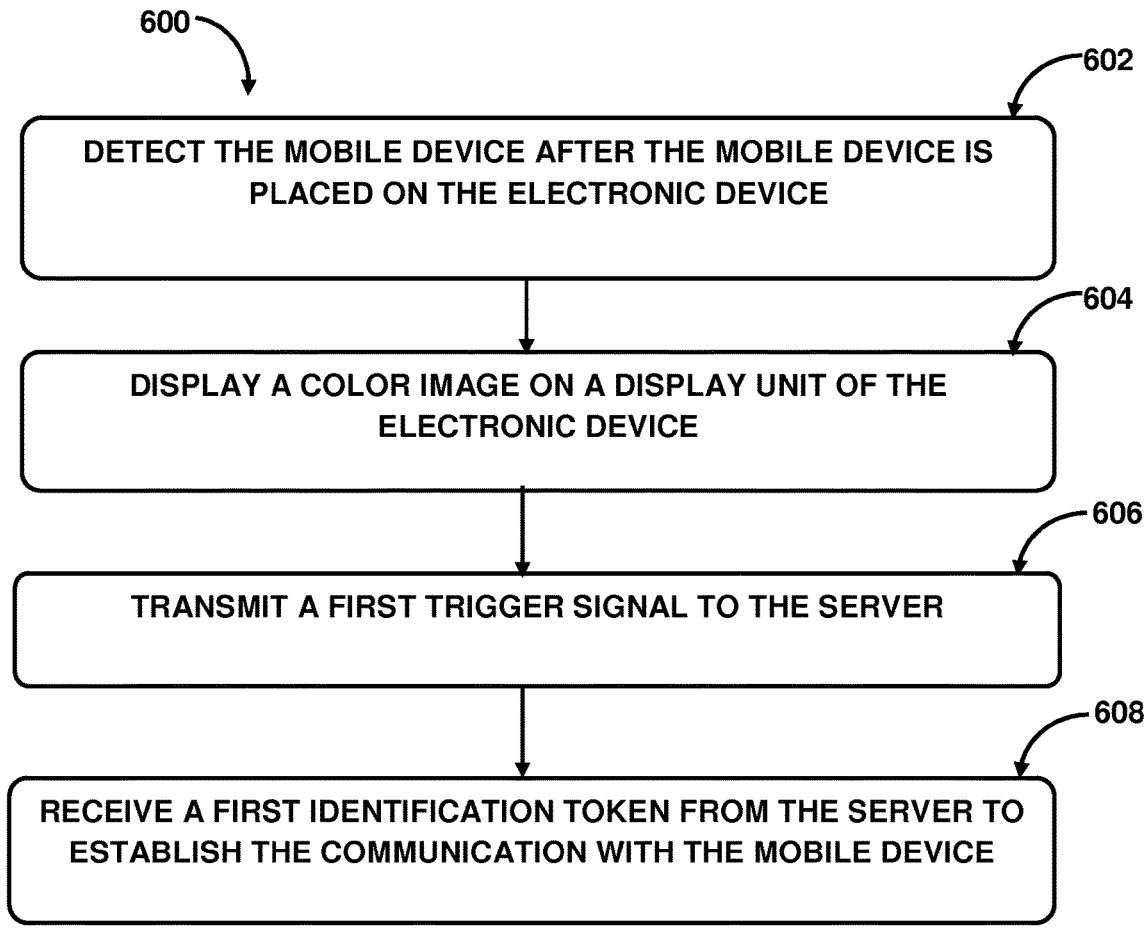
Figure 4C:
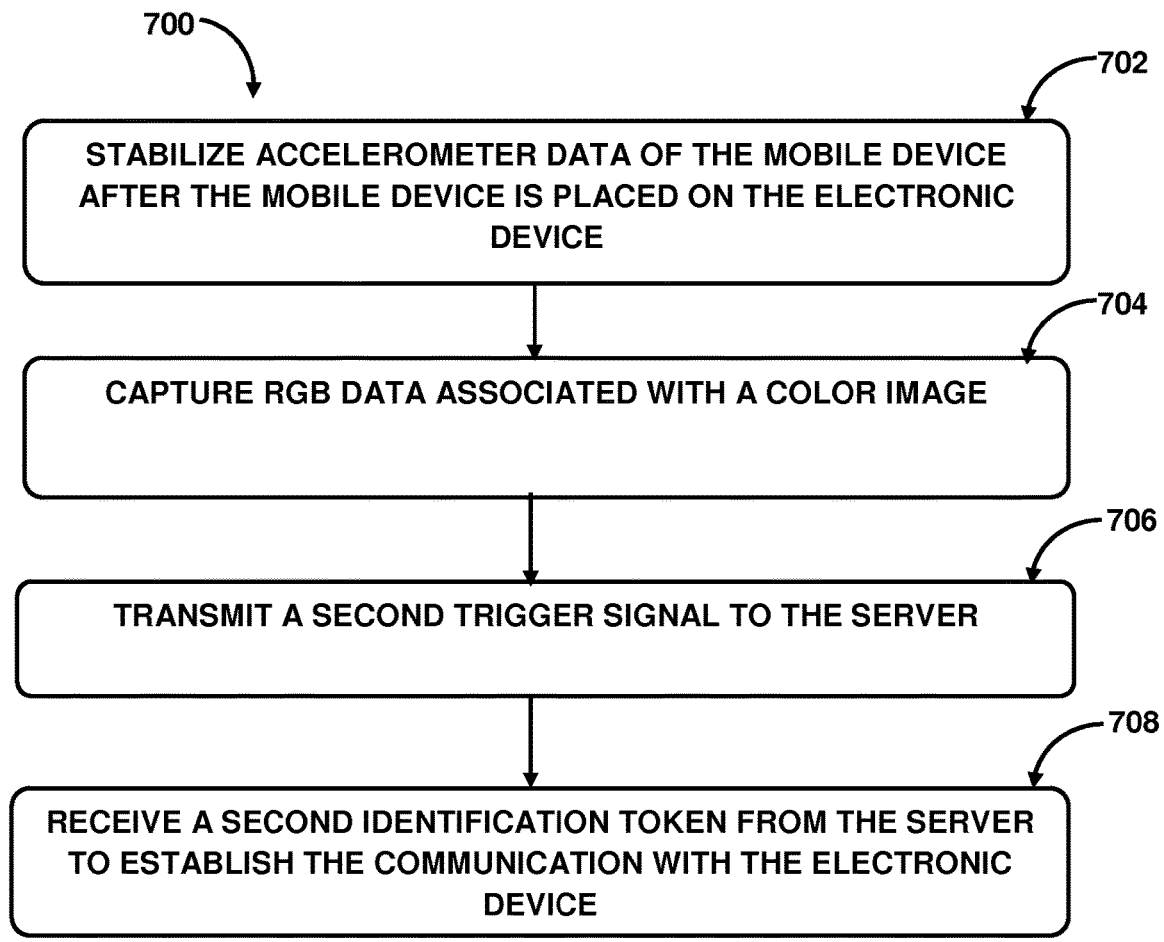

FIG. 4-A illustrates a method 500 for providing the communication between the electronic device and the mobile device through the server, in accordance with some embodiments. The method 500 may be described in the general context of computer executable instructions. Generally, computer executable instructions can include routines, programs, objects, components, data structures, procedures, modules, functions, etc., that perform particular functions or implement particular abstract data types.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described server 102.

At block 502, a first trigger signal from the electronic device and a second trigger signal from the mobile device may be received. In one implementation, the trigger receiving module 212 may receive the first trigger signal and the second trigger signal.

At block 504, the first trigger signal may be matched with the second trigger signal. In one implementation, the matching module 214 may match the first trigger signal with the second trigger signal.

At block 506, a first identification token for the electronic device and a second identification token for the mobile device may be generated. In one implementation, the token generation module 216 may generate the first identification token and the second identification token.

At block 508, the first identification token and the second identification token may be respectively transmitted to the electronic device and the mobile device. In one implementation, the transmission module 218 may transmit the first identification token and the second identification token.

At block 510, the communication between the electronic device and the mobile device may be provided. In one implementation, the transmission module 218 may provide the communication between the electronic device and the mobile device.

FIG. 4-B illustrates a method 600 for establishing the communication between the electronic device and the mobile device through the server, in accordance with some embodiments. The method 600 may be described in the general context of computer executable instructions. Generally, computer executable instructions can include routines, programs, objects, components, data structures, procedures, modules, functions, etc., that perform particular functions or implement particular abstract data types.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method 600 can be implemented in any suitable hardware, software, firmware, or combination thereof. However, for ease of explanation, in the embodiments described below, the method 600 may be considered to be implemented in the above described electronic device 104(*a*).

At block 602, when the mobile device is placed on the electronic device, the mobile device may be detected. In one implementation, the detection module 312 may detect the mobile device.

At block 604, a color image on a display unit of the electronic device may be displayed. In one implementation, the display module 314 may display the color image may.

At block 606, a first trigger signal may be transmitted to the server. In one implementation, the transmitting module 316 may transmit the first trigger signal.

At block 608, a first identification token from the server may be received to establish the communication with the mobile device. In one implementation, the receiving module 318 may receive the first identification token.

FIG. 4-C illustrates a method 700 for establishing the communication between the mobile device and the electronic device through the server, in accordance with some embodiments. The method 700 may be described in the general context of computer executable instructions. Generally, computer executable instructions can include routines, programs, objects, components, data structures, procedures, modules, functions, etc., that perform particular functions or implement particular abstract data types.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method 700 can be implemented in any suitable hardware, software, firmware, or combination thereof. However, for ease of explanation, in the embodiments described below, the method 700 may be considered to be implemented in the above described mobile device 104(*b*).

At block 702, after the mobile device is placed on the electronic device, accelerometer data of the mobile device may be stabilized. In one implementation, the stabilization module 412 may stabilize the mobile device.

At block 704, RGB data associated with a color image may be captured. In one implementation, the sensing module 414 may capture the RGB data.

At block 706, a second trigger signal to the server may be transmitted. In one implementation, the transmission module 416 may transmit the second trigger signal.

At block 708, a second identification token may be received from the server to establish the communication with the electronic device. In one implementation, the receiving module 418 may receive the second identification token.

The present disclosure describes a method for providing the stateless communication between the two or more devices. The stateless communication may be established between the two or more devices through a server for a one-time session. This methodology of establishing the stateless communication enables the user to establish the communication without explicit pairing of the two devices.

Although implementations for methods and systems for establishing communication between the mobile device and the electronic device through the server have been described in language specific to structural features and/or methods, it is appreciated that the appended claims are not necessarily limited to the specific features or methods described. Rather, the specific features and methods are disclosed as examples of implementations for establishing the communication.

What is claimed is:

1. A method for providing communication between an electronic device and a mobile device through a server, the method being performed by a processor using programmed instructions stored in a memory, the method comprising:

receiving a first trigger signal from the electronic device and a second trigger signal from the mobile device, wherein the first trigger signal comprises color data generated by the electronic device, an identification number of the electronic device, a time stamp of the first trigger signal, and location information of the electronic device and wherein the second trigger signal comprises RGB data captured by the mobile device, an identification number of the mobile device, a time stamp of the second trigger signal, and location information of the mobile device;

matching the first trigger signal with the second trigger signal in order to validate the communication between the electronic device and the mobile device, wherein the trigger signals are matched based on the received color data, RGB data, location information and time-stamp of the trigger signals, wherein the color data of the first trigger signal is matched with the RGB data of the second trigger signal, and wherein the matching is validated if the color data of the first trigger signal matches the RGB data of the second trigger signal;

generating a first identification token for the electronic device and a second identification token for the mobile device based on the matching;

transmitting the first identification token to the electronic device and the second identification token to the mobile device; and providing the communication between the electronic device and the mobile device based on the first identification token and the second identification token.

2. The method of claim 1, wherein the first identification token comprises the identification number of the mobile device.

3. The method of claim 1, wherein the communication of the mobile device with the electronic device through the server is stateless communication or pair-less communication.

4. The method of claim 1, wherein the second identification token comprises the identification number of the electronic device.

5. A system for providing communication between an electronic device and a mobile device, the system comprising:
one or more processors; and
a memory storing processor-executable instructions comprising instructions to:
receive a first trigger signal from the electronic device and a second trigger signal from the mobile device, wherein the first trigger signal comprises color data generated by the electronic device, an identification number of the electronic device, a time stamp of the first trigger signal, and location information of the electronic device and wherein the second trigger signal comprises RGB data captured by the mobile device, an identification number of the mobile device, a time stamp of the second trigger signal, and location information of the mobile device;
match the first trigger signal with the second trigger signal to validate the communication between the electronic device and the mobile device, wherein the trigger signals are matched based on the received color data, RGB data, location information and timestamp of the trigger signals, wherein the color data of the first trigger signal is matched with the RGB data of the second trigger signal, and wherein the matching is validated if the color data of the first trigger signal matches the RGB data of the second trigger signal;
generate a first identification token for the electronic device and a second identification token for the mobile device based on matching;
transmit the first identification token to the electronic device and the second identification token to the mobile device; and
provide the communication between the electronic device and the mobile device based on the first identification token and the second identification token.

6. The system of claim 5, wherein the instructions further comprises instructions to generate a color image to be displayed on the electronic device.

7. A non-transitory computer program product having embodied thereon computer program instructions for providing communication between an electronic device and a mobile device, the instructions comprising instructions for:
receiving a first trigger signal from the electronic device and a second trigger signal from the mobile device, wherein the first trigger signal comprises color data generated by the electronic device, an identification number of the electronic device, a time stamp of the first trigger signal, and location information of the electronic device and wherein the second trigger signal comprises RGB data captured by the mobile device, an identification number of the mobile device, a time stamp of the second trigger signal, and location information of the mobile device;
matching the first trigger signal with the second trigger signal to validate the communication between the electronic device and the mobile device, wherein the trigger signals are matched based on the received color data, RGB data, location information and timestamp of the trigger signals, wherein the color data of the first trigger signal is matched with the RGB data of the second trigger signal, and wherein the matching is validated if the color data of the first trigger signal matches the RGB data of the second trigger signal;
generating a first identification token for the electronic device and a second identification token for the mobile device based on the matching;
transmitting the first identification token to the electronic device and the second identification token to the mobile device; and
providing the communication between the electronic device and the mobile device based on the first identification token and the second identification token.

8. A method for establishing communication of an electronic device with a mobile device through a server, the method being performed by a processor using programmed instructions stored in a memory, the method comprising:
detecting the mobile device after the mobile device is placed on the electronic device, wherein detecting the mobile device is based on at least one of a blob detection mechanism and flash of the mobile device;
displaying a color image on a display unit of the electronic device based on the detection of the mobile device;
transmitting a ffrst trigger signal to the server, wherein the first trigger signal comprises color data of the color image, an identification number of the electronic device, a time stamp of the first trigger signal, and location information of the electronic device; and
receiving a first identification token from the server for establishing the communication with the mobile device, wherein the first identification token is received after matching, by the server, the first trigger signal with a second trigger comprising RGB data captured by the mobile device, an identification number of the mobile device, a time stamp of the second trigger signal, and location information of the mobile device.

9. The method of claims 8, wherein the first trigger signal further comprises an identification number of the electronic device, a time stamp of the first trigger signal, and location information of the electronic device.

10. The method of claim 8, wherein the first identification token comprises the identification number of the mobile device.

11. The method of claim 8, wherein the communication is stateless communication or pair-less communication.

12. An electronic device for establishing communication with a mobile device through a server, the electronic device comprising:
one or more processors; and
a memory storing process-executable instructions comprising instructions to:
detect the mobile device after the mobile device is placed on the electronic device, wherein detecting the mobile device is based on at least one of a blob detection mechanism and flash of the mobile device;
display a color image on a display unit of the electronic device based on the detection;
transmit a first trigger signal to the server, wherein the first trigger signal comprises color data of the color image, an identification number of the electronic device, a time stamp of the first trigger signal, and location information of the electronic device; and
receive a first identification token from the server for establishing the communication with the mobile device, wherein the first identification token is received after matching, by the server, the first trigger signal with a second trigger comprising RGB data captured by the mobile device, an identification number of the mobile device, a time stamp of the second trigger signal, and location information of the mobile device.

13. The electronic device of claim 12, wherein the instructions further comprising instructions to generate the color image.

14. A non-transitory computer program product having embodied thereon computer program instructions for establishing communication of an electronic device with a mobile device through a server, the instructions comprising instructions for:
   detecting the mobile device after the mobile device is placed on the electronic device, wherein detecting the mobile device is based on at least one of a blob detection mechanism and flash of the mobile device;
   displaying a color image on a display unit of the electronic device based on the detection;
   transmitting a first trigger signal to the server, wherein the first trigger signal comprises color data of the color image, an identification number of the electronic device, a time stamp of the first trigger signal, and location information of the electronic device; and
   receiving a first identification token from the server for establishing the communication with the mobile device, wherein the first identification token is received after matching, by the server, the first trigger signal with a second trigger comprising RGB data captured by the mobile device, an identification number of the mobile device, a time stamp of the second trigger signal, and location information of the mobile device.

15. A method for establishing communication of a mobile device with an electronic device through a server, the method being performed by a processor using programmed instructions stored in a memory, the method comprising:
   stabilizing accelerometer data of the mobile device after the mobile device is placed on the electronic device, wherein the mobile device is stabilized with respect to at least one axis;
   capturing RGB data associated with a color image comprising color data generated by the electronic device after stabilizing of the accelerometer data;
   transmitting a second trigger signal to the server, wherein the second trigger signal comprises the captured RGB data, an identification number of the mobile device, a time stamp of the second trigger signal, and location information of the mobile device; and
   receiving a second identification token from the server for establishing the communication with the electronic device, wherein the second identification token is received after matching, by the server, the second trigger signal with a first trigger signal from the electronic device comprising color data generated by the electronic device, an identification number of the electronic device, a time stamp of the first trigger signal, and location information of the electronic device.

16. The method of claim 15, wherein the communication is stateless communication or pair-less communication.

17. The method of claim 15, wherein the second trigger signal further comprises an identification number of the mobile device, a time stamp of the second trigger signal, and location information of the mobile device.

18. The method of claim 15, wherein the second identification token comprises the identification number of the electronic device.

19. A mobile device for establishing communication with an electronic device through a server, the mobile device comprising:
   one or more processors; and
   a memory storing processor-executable instructions comprising instructions to:
      stabilize accelerometer data of the mobile device after the mobile device is placed on the electronic device, wherein the mobile device is stabilized with respect to at least one axis;
      capture RGB data associated with a color image comprising color data generated by the electronic device after stabilizing of the accelerometer data;
      transmit a second trigger signal to the server, wherein the second trigger signal comprises the RGB data, an identification number of the mobile device, a time stamp of the second trigger signal, and location information of the mobile device; and
      receive a second identification token from the server for establishing of the communication with the electronic device, wherein the second identification token is received after matching, by the server, the second trigger signal with a first trigger signal from the electronic device comprising color data generated by the electronic device, an identification number of the electronic device, a time stamp of the first trigger signal, and location information of the electronic device.

20. A non-transitory computer program product having embodied thereon computer program instructions for establishing communication of a mobile device with an electronic device through a server, the instructions comprising instructions for:
   stabilizing accelerometer data of the mobile device after the mobile device is placed on the electronic device, wherein the mobile device is stabilized with respect to at least one axis;
   capturing RGB data associated with a color image comprising color data generated by the electronic device after stabilizing the accelerometer data; and
   transmitting a second trigger signal to the server, wherein the second trigger signal comprises the RGB data, an identification number of the mobile device, a time stamp of the second trigger signal, and location information of the mobile device; and
   receiving a second identification token from the server for establishing of the communication with the electronic device, wherein the second identification token is received after matching, by the server, the second trigger signal with a first trigger signal from the electronic device comprising color data generated by the electronic device, an identification number of the electronic device, a time stamp of the first trigger signal, and location information of the electronic device.

* * * * *